July 25, 1933.  J. A. BROOKS  1,919,196
WHIRLING SPRAYER
Filed Jan. 16, 1931

Inventor
John A. Brooks
Owen + Owen
By
Attorneys

Patented July 25, 1933

1,919,196

UNITED STATES PATENT OFFICE

JOHN A. BROOKS, OF DETROIT, MICHIGAN, ASSIGNOR TO ELMER G. MUNZ, OF DETROIT, MICHIGAN

WHIRLING SPRAYER

Application filed January 16, 1931. Serial No. 509,050.

This invention relates to spraying devices, or sprinkling systems, such as used for watering lawns, shrubs or flower beds, but more particularly to a spray head of the disappearing type, which, when in operation, extends above the ground, but, when not in use, is disposed beneath or substantially flush with the surface of the ground.

An object of this invention is to provide a new and improved spray device of the above character, which automatically moves above the ground when in operation and at the same time rotates or whirls but drops back substantially flush with the surface of the ground when not in use or the flow of pressure fluid is stopped.

Another object is to produce a simple and efficient spray head of the disappearing type which automatically whirls when in use and which is conveniently adjustable so that the speed of rotation may be increased or diminished as desired.

Further objects of my invention reside in the new and improved details of construction, arrangement and operation of the spray head, and for purposes of illustration an embodiment of the invention is shown on the accompanying drawing, in which.

Figure 1:
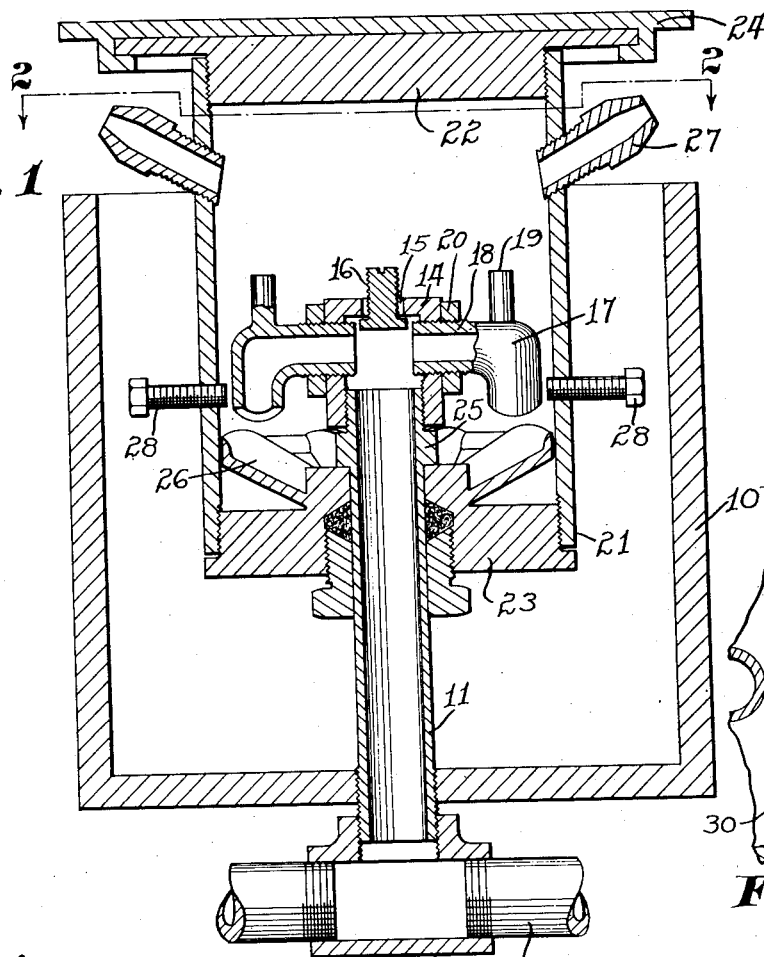
Fig. 1 is a vertical sectional elevation of a spray head showing the whirling or rotating parts in the elevated position they assume when in use and under fluid pressure.

The illustrated embodiment of the invention comprises a spraying device having a cup or casing 10 of brass or other suitable material which is placed in the ground so that the upper edge or rim is substantially flush with the surface. Having its lower end extending centrally through and in threaded engagement with the bottom wall of the cup 10 is an upright tube 11, preferably of brass, which is connected by a joint 12 to a pressure fluid supply line 13.

The tube 11 is somewhat shorter than the side walls of the casing 10, and screwed on the outer end of the tube is a cap or cage 14 in the outer end of which are by-pass ports 15 controlled by a screw 16 flanged at its lower end.

In screw threaded engagement with the side walls of the cap 14 are oppositely facing nozzles 17 arranged in diametrically opposed relation, and, as shown, the stem 18 of each nozzle extends at approximately right angles to the head. Lugs 19 on the nozzles 17 enable the same to be angularly adjusted, and lock nuts 20 on the stems 18 hold the nozzles in adjusted position.

Enclosing the nozzles 17 and slidable longitudinally of the tube 11 is a spray head comprising a tubular housing 21 closed at opposite ends by top and bottom disks 22 and 23 respectively screwed into the tube. The top disk 22 is imperforate and may be covered with a rubber cap 24 engageable with the rim of the casing 10 when the spray head is lowered within the cup. The bottom disk 23 slides over the tube 11, and a collar 25 on the tube limits the upward movement of the head.

In this instance a series of inclined turbine-like blades 26 are formed integral with the upper side of the lower disk 23, and are preferably arranged radially of the disk so that the pressure fluid from the nozzles 17 sets up a turbulence within the head and impinges against the surfaces thereof to impart a rotating or whirling action to the head when the latter is in the raised position shown on the drawing.

Projecting from opposite sides of the housing 21 adjacent the top disk 22 is a pair of spray nozzles 27 which are in threaded engagement with the housing. The nozzles or nipples are in offset or staggered relation, and are upwardly and outwardly inclined.

It is apparent that the spray head is normally disposed within the casing 10 and the cap 24 seated against the rim of the casing. When pressure fluid, such as water under pressure, is introduced to the main supply line 13, it flows through the upright tube 11 and outwardly through the nozzles 17, and the flow may be regulated by the post or screw 16. Due to the differential pressure areas of the end disks 22 and 23, the pressure fluid lifts the head until further movement is prevented by the stop collar 25 on the tube 11. Pressure fluid passing through the by-pass ports 15 impinges against the disk 22 and causes abrupt lifting of the head. When lifted the spray nozzles 27 are above the rim of the casing 10, and, as will be manifest from the drawing, the inclined turbine blades 26 are disposed directly beneath the nozzles 17. The pressure fluid from the nozzles flowing in opposite direction sets up a turbulence within the head and also impinges against the blades 26, which causes whirling motion of the head. The arrangement of the spray nozzles 27 is such as to insure rotation of the head.

In order to increase or diminish the rotating speed of the head, the angle of the nozzles 17 may be adjusted by removing the upper disk 22 and adjusting the nozzles in one direction or the other by the lugs 19.

Set screws 28 in the tubular wall 21 of the housing enable the sprayer to be held against rotation and used as a half spray. By moving the screws 28 inwardly so as to abut against the nozzles 17, rotation of the housing is prevented and the spray from the head confined to a limited area.

Figure 4:
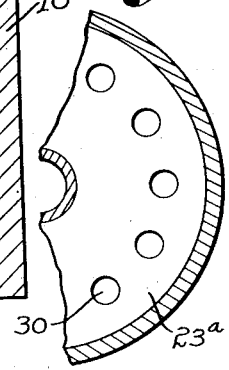
Fig. 4 is a sectional view of the line 4—4 of Fig. 3.
Figure 3:
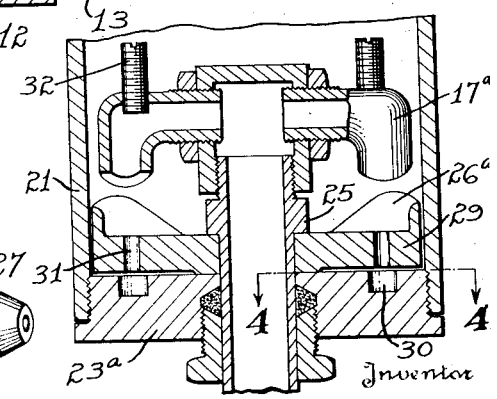
Fig. 3 is a vertical sectional elevation of a portion of a spray head showing a clutch for rotating the head, and the parts in raised position.
Figure 2:
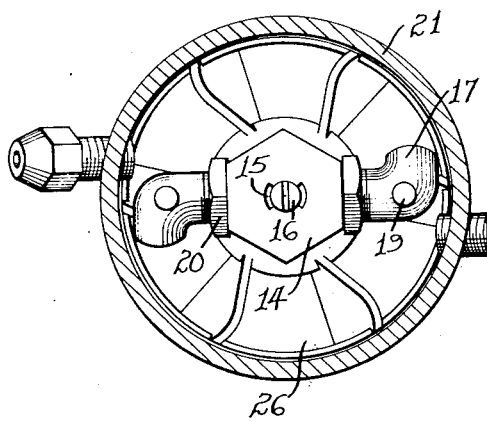
Fig. 2 is a transverse sectional view in the line 2—2 of Fig. 1.

In the alternate form shown in Figs. 3 and 4, a disk 29 is rotatable on the tube 11 beneath a pair of actuating nozzles 17ª, and formed on the upper surface of the disk are blades 26ª against which pressure fluid from the nozzles 17ª impinges. The disk 29 is adapted to abut against the collar 25 so that when the head 21 is raised a closure cap 23ª therefor is disposed directly beneath the disk. Formed in the upper surface of the cap 23ª is an annular row of sockets 30, and adapted to register with the sockets are holes 31 in the disk 29 arranged in an annular row.

The disk 29 may rotate independently of the spray head, and when the head is in raised position the whirling action of the disk imparts rotation to the spray head. This is due to the holes 31 and sockets 30 in the disk and cap respectively since in the whirling motion of the disk the holes 31 move successively over the sockets 30 causing the pressure fluid to create a suction to draw the fluid from the sockets and thereby rotate the head substantially in unison with the disk. This provides a hydraulic clutch for the spray head when liquid is employed as the spraying medium.

In this form, the by-pass ports 15 are eliminated, and in order to regulate the flow of pressure fluid through the nozzles 17ª a regulating screw 32 is provided for each nozzle. By adjusting the screws 32 the spray from the head 21 may be increased to cover a larger area or diminished to cover a smaller area.

An important advantage of this sprayer is that a number of them may be connected to the same pressure fluid supply line and all of the units will rotate or whirl at the same rate of speed and thereby spray equal areas. Since gears and other noisy parts are not used, the sprayer operates without a disturbing noise other than the swish of the spray. Since the top disk 22 is adjustably screwed into the housing it may be moved in and out to take care of variations in the ground level, which is an important factor in installing devices of this character.

It is to be understood that numerous changes in details of construction, arrangement and operation may be effected without departing from the spirit of the invention, especially as defined in the appended claims.

What I claim is:

1. In a spraying device, an upright tube providing a pressure fluid passage, a spray head movable longitudinally of said tube and adapted to move upwardly upon the introduction of pressure fluid, a device within said head and responsive to the pressure fluid from said passage for automatically rotating said head, and means for adjusting the direction of flow of pressure fluid into said head, thereby to regulate the speed of rotation thereof.

2. In a spraying device, an upright tube providing a pressure fluid passage, a spray head movable longitudinally of said tube and adapted to move upwardly upon the introduction of pressure fluid, nozzle means on the end of said tube disposed within said head, blade means rotatable with said head and responsive to pressure fluid from said passage for imparting rotation to said head, and means to adjust said nozzle means for regulating the speed of rotation of said head.

3. In a spraying device, an upright tube providing a pressure fluid passage, a spray head movable longitudinally of said tube and adapted to move upwardly upon the introduction of pressure fluid, a pair of nozzles for directing pressure fluid in opposite directions, and blade means in the lower part of said head beneath said nozzles and fixed for rotation to said head whereby pressure fluid from said nozzles creates a turbulence within said head against said blade means for imparting rotation to said head.

4. In a spraying device, an upright tube providing a pressure fluid passage, a spray head movable longitudinally of said tube and adapted to move upwardly upon the introduction of pressure fluid, a pair of nozzles for directing pressure fluid in opposite directions, blade means in the lower part of said head beneath said nozzles and fixed for rotation to said head whereby pressure fluid from said nozzles creates a turbulence within said head against said blade means for imparting rotation to said head, and a pair of spray nozzles adjustable in said head arranged in offset relation with respect to the axis of said head.

5. In a spraying device, a casing open at one end thereof adapted to be submerged in the ground with the rim thereof substantially flush with the surface of the ground, an upwardly disposed tube in the bottom wall of said casing providing a pressure fluid passage, a spray head movable longitudinally of said tube and adapted to move upwardly upon the introduction of pressure fluid to said head, a cap closing the upper end of said head adapted to fit the rim of said casing for substantially closing same when said head is in lowered position, nozzle means on said tube for directing pressure fluid toward the bottom of said head, and blade means rotatable with said head disposed beneath said nozzle means whereby said nozzle and blade means cooperate in imparting rotation to said head.

6. In a spraying device, an upright tube providing a pressure fluid passage, a spray head movable longitudinally of said tube and adapted to move upwardly upon the introduction of pressure fluid from said passage, a cap for the upper end of said tube, a pair of nozzles on said tube and communicating with said passage means for adjusting the position of said nozzles, blade means carried by said head and disposed beneath said nozzles responsive to pressure fluid from said nozzles for imparting rotation to said head, said cap having a by-pass, adjustable means controlling said by-pass, and opposed offset upwardly inclined spray nozzles adjustable in said head and disposed above said blade means.

7. In a spraying device, an upright tube providing a pressure fluid passage, a spray head movable upwardly on said tube upon the introduction of pressure fluid from said passage, means closing the outer end of said tube having an opening through which pressure fluid passes directly against the outer end of said head for raising same, blade means on said head, and nozzle means for directing pressure fluid to said blade means, said blade means being brought into effective relation to said nozzle means by raising said head.

8. In a spraying device, an upwardly disposed tube providing a pressure fluid passage, a spray head movable longitudinally of said tube and adapted to move upwardly upon the introduction of pressure fluid, nozzle means on said tube, and clutch means on said tube and arranged below said nozzle means to be impinged by fluid therefrom to impart rotation to said head when the clutch means is in raised position.

9. In a spraying device, an upwardly disposed tube providing a pressure fluid passage, a spray head movable longitudinally of said tube and adapted to move upwardly upon the introduction of pressure fluid, nozzle means on said tube, and clutch means on said tube rotatable independently of said head and arranged below said nozzle means to be impinged by fluid therefrom to impart rotation to said head when the clutch means is in raised position.

10. In a spraying device, an upwardly disposed tube providing a pressure fluid passage, a spray head movable longitudinally of said tube and adapted to move upwardly upon the introduction of pressure fluid, nozzle means on said tube, a clutch member rotatable on said tube independently of said head, and disposed beneath said nozzle means, blade means on said member adapted to receive the force of pressure fluid from said nozzle means, said clutch member and spray head having plurality of annularly spaced openings and sockets respectively adapted to register recurrently when said clutch is rotated, whereby rotative movement of said clutch member imparts rotation to said head.

11. In a spraying device, a tube providing a pressure fluid passage, a spray head on said tube, and a clutch responsive to pressure fluid from said passage for automatically rotating said head, said clutch comprising an annulus rotatable on said tube independently of said head and disposed below the outlet of said fluid passage when in operative position.

12. In a spraying device, an upright tube providing a pressure fluid passage, nozzle means on said tube, a spray head movable longitudinally of said tube and adapted to move upwardly upon the introduction of pressure fluid, means responsive to pressure fluid from said passage for automatically rotating said head adapted to be moved into effective reltion to said nozzle means upon raising said head, and means to regulate the flow of pressure fluid through said nozzle means.

13. In a spraying device, an upright tube providing a pressure fluid passage, a pair of nozzles forming outlets from said passage, a spray head movable longitudinally of said tube and adapted to move upwardly upon the introduction of pressure fluid, means responsive to pressure fluid from said nozzles for automatically rotating said head adapted to be moved into effective relation to said nozzles upon raising said head, and means in each nozzle for regulating the flow of pressure fluid to the inside of said head.

14. In a spraying device, a casing open at one end thereof adapted to be submerged in the ground with the rim thereof substantially flush with the surface of the ground, an upwardly disposed tube in the bottom wall of said casing providing a pressure fluid passage, a spray head movable longitudinally of said tube and adapted to move upwardly upon the introduction of pressure fluid to said head, means closing the upper end of said head and adapted to fit the rim of said casing for substantially closing same when said head is in lowered position, a cap closing the upper end of said tube having an orifice through which pressure fluid passes directly against said spray head-closing means for raising said head upon the introduction of pressure fluid, means for regulating the size of said orifice, nozzle means for directing pressure fluid from said tube toward the bottom of said head, and blade means rotatable with said head disposed beneath said nozzle means to be impinged by fluid therefrom to impart rotation to said head.

15. In a spraying device, a tube providing a pressure fluid passage, a spray head on said tube, and a clutch responsive to pressure fluid from said passage for automatically rotating said head, said clutch comprising a member rotatable on said tube independently of said head and disposed below the outlet of said fluid passage when in operative position.

JOHN A. BROOKS.